Figure 3:
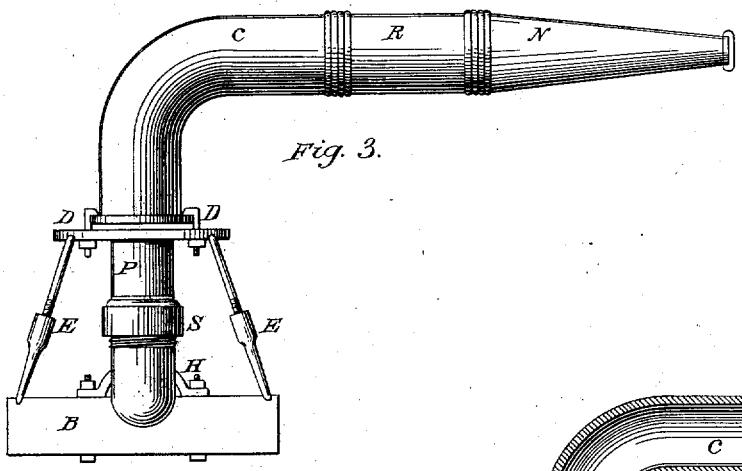

J. M. ALLENWOOD,

Assignor, by mesne assignments, to J. CRAIG.

Ore-Washing Apparatus for Hydraulic Mining

No. 8,037. Reissued Jan. 15, 1878.

WITNESSES:

C. Clarence Poole

Rich'd K. Evans

INVENTOR:

Joseph M. Allenwood per Attys. A. H. Evans & Co

N. PETERS, PHOTO-LITHOGRAPHER, WASHINGTON, D. C.

UNITED STATES PATENT OFFICE.

JOSEPH M. ALLENWOOD, OF TIMBUCTOO, CALIFORNIA, ASSIGNOR, BY MESNE ASSIGNMENTS, TO JOSEPH CRAIG.

IMPROVEMENT IN ORE-WASHING APPARATUS FOR HYDRAULIC MINING.

Specification forming part of Letters Patent No. 43,468, dated July 12, 1864; Reissue No. 5,255, dated January 28, 1873; Reissue No. 8,037, dated January 15, 1878; application filed January 2, 1878.

*To all whom it may concern:*

Be it known that I, JOSEPH M. ALLENWOOD, of Timbuctoo, in the county of Yuba and State of California, have invented an Improved Hydraulic Machine for Washing Ores, of which the following specification is a full, clear, and exact description, reference being had to the accompanying drawings.

My invention relates to certain improvements in machines for directing a stream of water under pressure against a bank of earth, cement, or gravel, for the purpose of cutting away and tearing down the bank, and for the further purpose of disintegrating the earth, sand, or gravel.

These machines receive and discharge the water under a high pressure, so that the water issues from the nozzle with great force.

The pipe through which the water is conducted to the machine lies upon the ground, so that it is found necessary, for convenience, to make a bend or goose-neck before attaching the discharge pipe and nozzle, in order to admit of the nozzle being ranged up or down, or to either side, for the purpose of directing the stream. This bend in the pipe imparts to the stream of water a spiral motion in the discharge-pipe, so that when it issues from the nozzle it scatters, so as to spoil the effectiveness of the stream.

My first improvement remedies this difficulty; and it consists in the placing of diaphragms in the pipe, which serve to straighten the stream after it has passed the bend above described and before it leaves the nozzle.

Another difficulty which, before my improvement, attended the employment of these hydraulic nozzles, was the amount of power required to move the discharge pipe and nozzle in a horizontal direction when it was desired to change the direction of the stream of water. The rigidity of the body of water in the pipe and nozzle was such that it required the exertion of great force to swivel the discharge pipe and nozzle after it was once started into action.

The machine, as I originally constructed it, was provided with a flexible hose-section for connecting the discharge-pipe with the nozzle, so that the hose-section formed a part of the nozzle, and served as a joint to render the nozzle flexible. It was soon discovered by those who used my machine, that if the nozzle should by any means, accidental or otherwise, get turned to an angle to the discharge-pipe, the force of the water would cause the discharge pipe and nozzle to fly suddenly in an opposite direction, and this action was characterized by the miners as "bucking." This led to the further discovery that if the nozzle was gently turned against or cramped upon the stream of water in either direction, the force of the stream of water passing through the discharge pipe and nozzle would cause them to move slowly in an opposite direction, and thence forward. The machine was thus used where any difficulty was experienced in moving the nozzle by main strength.

In the accompanying drawings, A, in elevation, section, and plan, represents a main pipe leading to the reservoir and conducting the water to the place of operation. At S, Fig. 3, is shown a screw, for the purpose of detaching the upper portions at pleasure; C, in Fig. 3, is a pipe fitted over P, and upon which C revolves with a water-tight joint, and, being bent at right angles to P, can be turned to any desired point of the compass. (See V V, plan, Fig. 1, where D D D D D D represent hook-headed bolts for holding C in its place; see D D, Fig. 2.)

Figure 1:
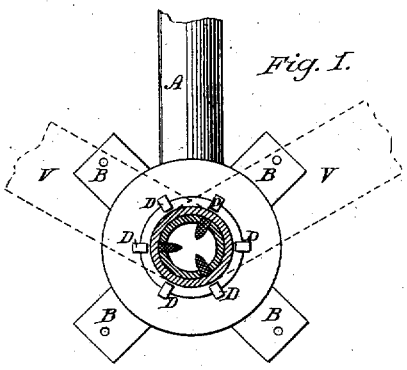

In plan, Fig. 1, at B B, are shown two foundation-sticks, locked together at right angles, for supporting the other parts of the apparatus, and to which they are attached by the fastening marked H in elevation and section.

Figure 2:
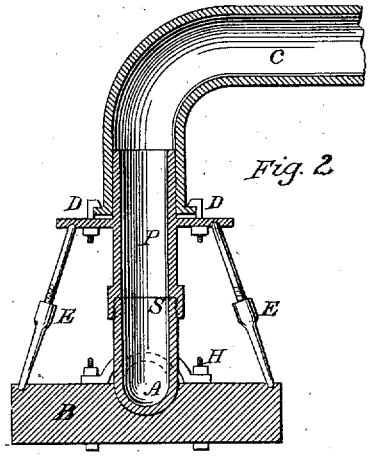

At E E, in Figs. 2 and 3, are shown four braces for adjusting the parts in a proper position. These braces are provided with a socket and screw, whereby they can be shortened or lengthened at pleasure.

At R, in Fig. 3, is shown a short piece of hose, composed of some kind of flexible material, such as rubber or canvas, whereby the discharge-pipe N can be elevated or depressed, so as to direct the discharge to any desired elevation, while by bending the nozzle or discharge-pipe N to either side the force of the stream of water passing through the discharge-pipe will cause the pipes C N to be swiveled in an opposite direction upon the joint D.

To accomplish this all the attendant has to do is to brace against the outer end of pipe C with one hand, while he bends the nozzle N toward him slowly with the other hand. As soon as the pipe is cramped upon the stream of water, the force of the water acting upon the outer bent pipe will cause both the pipes C and N to move in an opposite direction until it has arrived in the desired position.

What I claim as my invention, and desire to secure by Letters Patent, is—

1. The method of operating hydraulic nozzles in order to change their horizontal direction, consisting in cramping the pipe or nozzle upon the stream of water which is passing through the discharge-pipe, so as to move the machine in an opposite direction by the force of the water passing through the discharge-pipe, substantially as above specified.

2. The combination of a discharge-pipe provided with guides or diaphragms, and the elbow C, connected by a working joint with the supply-pipe A, substantially as and for the purposes above specified.

3. The combination of two elbows, C A, with the swiveling joint D, substantially as and for the purposes above described.

4. The combination of the two working joints or couplings D and R with the discharge-pipe N and supply-pipe A, by means of which both the horizontal and vertical motions are obtained, substantially as and for the purposes specified.

In witness whereof I have hereunto set my hand and seal.

J. M. ALLENWOOD. [L. S.]

Witnesses:
D. R. BOULTON,
J. P. ENGEL.